(No Model.)
C. PHELON.
STANCHION.
No. 464,080. Patented Dec. 1, 1891.
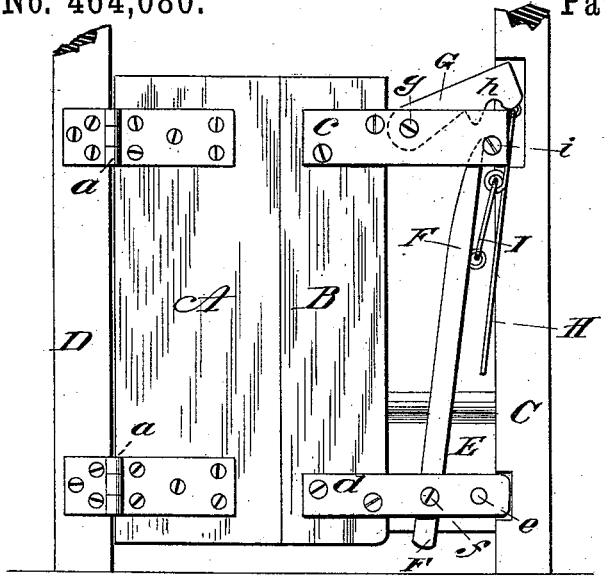
Fig I.
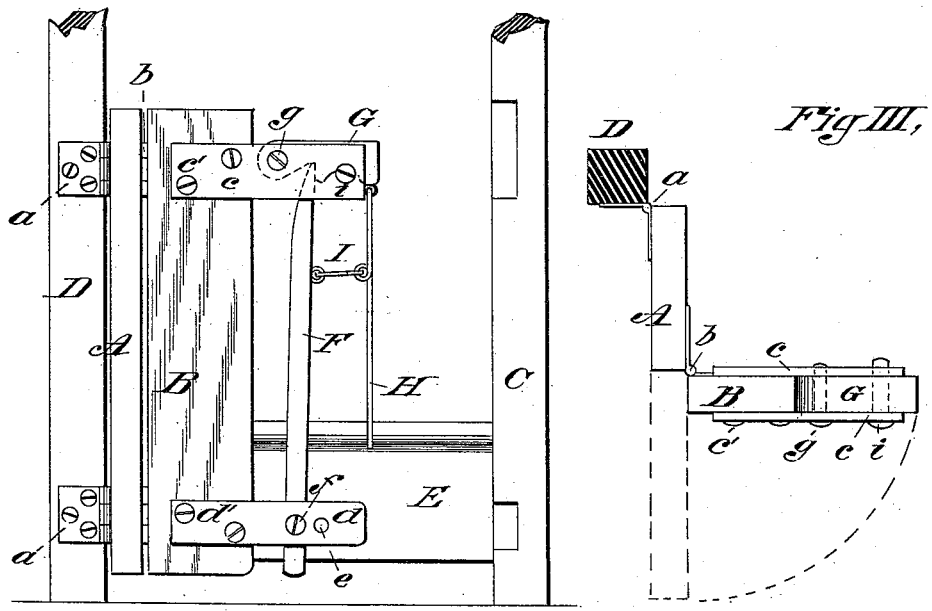
Fig II.
Fig III.
WITNESSES:
Christopher Clarke
E. E. Case
INVENTOR
Cyrus Phelon
BY R. F. Hyde
ATTORNEY.

UNITED STATES PATENT OFFICE.

CYRUS PHELON, OF EAST GRANVILLE, MASSACHUSETTS.

STANCHION.

SPECIFICATION forming part of Letters Patent No. 464,080, dated December 1, 1891.

Application filed July 8, 1891. Serial No. 398,753. (No model.)

*To all whom it may concern:*

Be it known that I, CYRUS PHELON, a citizen of the United States, residing at East Granville, in the county of Hampden and State of Massachusetts, have invented a new and useful Stanchion for Live Stock, of which the following is a specification.

The first part of my improvements relate to a movable and flexible stanchion, having for its object an increased latitude of movement for the animal secured thereto, and the second part relates to mechanism for automatically operating the neck-bar and its latch to secure an animal to or release it from the stanchion.

The invention consists in the combination and construction, as hereinafter described, and more particularly pointed out in the claims; and the invention is fully illustrated in the accompanying drawings, in which—

Figure I is a front elevation of my improved device. Fig. II is the same with the parts in a different position, and Fig. III is a top view with the parts in the position shown in Fig. II.

A B are two leaves forming the body of the stanchion and hinged to each other, as shown at $b$, so as to break outward when the stanchion is in the position seen in Fig. II, but so as to become rigid in the same plane when the stanchion is in the position shown in Fig. I. Upon the opposite side of the stanchion from the hinges $b$ are hinges $a$, securing the stanchion to the post D.

The device is shown as bearing against the two posts D C, as it is generally arranged in a barn for securing a number of cattle or sheep, where each post has a stanchion hinged to it, and also serves as a stop to limit the swing of the next stanchion in line with it; but the post C may be dispensed with, as the end of leaf A by coming against the adjacent post D forms a stop to limit the swing of the stanchion. It will be seen that the two leaves A B, thus having hinges upon opposite sides, afford a great latitude of movement to the animal secured to the stanchion, as it cannot only swing out on the hinges $a$ to the position shown in dotted lines in Fig. III, but also to the position shown in Fig. II and in Fig. III in solid lines, and an animal can back away from the manger E, either to sleep where its breath will not come in contact with hay or other feed or to be in a position more favorable for being cleaned or milked, so that the security of the stanchion is to an extent combined with the freedom of a halter rope or chain.

Upon opposite sides of leaf B and opposite each other, so as to form bearings for transverse hinge-screws, are pieces $c$ $d$, which may be formed of strong plank, with their corresponding ends firmly bolted, as shown at $c'$ $d'$, to the sides of the leaf B, and between the projecting ends of these pieces is inclosed the bar F. The bar F for inclosing the neck of the animal between its inner edge and the outer edge of leaf B has its lower end pivoted at $f$ between the pieces $d$ at a distance from the edge of leaf B equivalent to the thickness of the animal's neck to be held, to insure which screw-holes, as $e$, extend through the pieces $d$ to enable this bar F to be adjusted, and the upper or free end of bar F is received between the pieces $c$.

Within pieces $c$ above the bar F is a latch-piece G, hinged at one end at $g$ at a point near the edge of leaf B, and on the bottom edge of the latch-piece, between its hinge and free end, is a notch adapted to come over the free end of bar F and hold the bar from swinging outward. Furthermore, the lower edge of the latch-piece is provided with a notch $h$, which, when the latch-piece is in position, as shown in Fig. II, to latch the bar, falls over a transverse pin $i$, which serves to re-enforce the latch-hinge $g$ in resisting an outward pressure upon bar F. To the free end of latch-piece G is hinged to an eye or staple a dependent rod H, and between rod H and bar F, and approximately at right angles to them both when the bar is latched, as seen in Fig. II, is a stiff toggle or link I.

It will be seen that when the lower part of rod H, forming a handle, is grasped and pushed up the latch-piece is swung up and the bar F simultaneously swung out to release the animal, as shown in Fig. I; also, that from the position shown in the same figure a downward pull upon the handle will swing in the bar F, at the same time bringing down the latch-piece to lock it, so that in either case one motion performs what has generally required two operations, to an important saving of time in barns often containing a large number of stock.

The device shown in the drawings is of proportion and indicated material, such as would be constructed by the farmer with ordinary carpenters' tools and with available timber; but if manufactured for the trade the proportions and the material could be varied to produce a much lighter as well as handsomer device.

Now, having described my invention, what I claim is—

1. The within-described improved stanchion for live stock, consisting of a vertical support D, a leaf A, hinged at its inner edge to said support to swing out, a leaf B, having its vertical straight edge hinged to the corresponding edge of leaf A to swing inward therefrom, and a swinging retaining-bar, as F, pivoted to the leaf B to move to and from its outer edge, with means for locking it in a closed position, all combined and operating as and for the purpose set forth.

2. In a stanchion for live stock, the combination, with a vertical leaf for coming against one side of an animal's neck, of a swinging retaining-bar, as F, set off at its lower end by a pivot from said vertical leaf, a hinged latch-piece provided with a notch upon its lower surface adapted to fall over the free end of bar F, a pendent rod from the free end of the latch-piece, and a toggle connecting said rod with bar F, whereby a movement of said rod simultaneously operates the bar and the latch-piece.

3. The combination and arrangement, substantially as set forth, of support D, hinged leaves A B, forming a flexible attachment to said support, upper and lower hinge-supports $c\ d$ from leaf B, bar F, pivoted at $f$, latch G, pivoted at $g$ and provided with notches for resting at the same time over the end of bar F, pin $i$, rod H, attached to the latch-piece, and toggle I, secured, respectively, to bar F and rod H.

CYRUS PHELON.

Witnesses:
R. F. HYDE,
V. E. RAMES.